United States Patent [19]

Wanke

[11] Patent Number: 4,915,024

[45] Date of Patent: Apr. 10, 1990

[54] PRESS ROLL OF ADJUSTABLE SAG

[75] Inventor: Wilhelm Wanke, Heidenheim, Fed. Rep. of Germany

[73] Assignee: J. M. Voith GmbH, Fed. Rep. of Germany

[21] Appl. No.: 393,864

[22] Filed: Aug. 11, 1989

Related U.S. Application Data

[63] Continuation of Ser. No. 222,134, Jul. 21, 1988, abandoned.

[30] Foreign Application Priority Data

Aug. 26, 1987 [DE] Fed. Rep. of Germany ....... 3728389

[51] Int. Cl.$^4$ ............................................. B30B 3/04
[52] U.S. Cl. ............................... 100/162 B; 29/116.2; 72/243; 100/172; 100/170
[58] Field of Search ............... 100/162 B, 170, 168, 100/172, 47; 29/116.1, 116.2, 113.1, 113.2; 72/243, 245

[56] References Cited

U.S. PATENT DOCUMENTS

| | | | |
|---|---|---|---|
| Re. 32,586 | 2/1988 | Schiel | 29/116.2 |
| 4,213,232 | 7/1980 | Biondetti et al. | 29/116.2 |
| 4,399,747 | 8/1983 | Schiel et al. | 29/162 B |
| 4,414,890 | 11/1983 | Schiel et al. | 100/162 B |
| 4,676,117 | 6/1987 | Schiel | 29/116.2 X |
| 4,796,452 | 1/1989 | Schiel | 100/172 X |
| 4,837,907 | 6/1989 | Roerig et al. | 29/116.2 X |

FOREIGN PATENT DOCUMENTS

WO88/07634 10/1988 PCT Int'l Appl. .

Primary Examiner—Philip R. Coe
Assistant Examiner—Stephen F. Gerrity
Attorney, Agent, or Firm—Ostrolenk, Faber, Gerb & Soffen

[57] ABSTRACT

A press roll of adjustable sag has a roll shell which is rotatable around a stationary yoke that is supported on a pedestal. Each end of the roll shell terminates in a journal that is supported by a self aligning bearing disposed within a bearing housing. The bearing housing and the supported end of the roll shell is displaceable relative to the yoke transversely to the axis of the press roll and in the press plane of the press roll and the mating roll. Hydraulic support pistons on the yoke supply support for the press roll shell against the mating roll. The distances between the bearings of the roll shell and of the mating roll are approximately equal. To exert additional bending forces on the ends of the roll shell, a double acting hydraulic force producing piston is supported in the pedestal and is connected with the guide part in which the self aligning bearings are supported for displacing the guide part, for displacing the bearings, for displacing the end of the roll shell, generally in the press plane. That displacement also is adapted to lift the roll shell off the mating roll.

32 Claims, 4 Drawing Sheets

PRESS ROLL OF ADJUSTABLE SAG

This is a continuation of application Ser. No. 222,134, filed on July 21, 1988, now abandoned.

BACKGROUND OF THE INVENTION

The present invention relates to a press roll of adjustable sag which cooperates with a mating roll. In particular, the invention is concerned with force producing means at the ends of the press roll shell for deflecting and moving the ends.

A press roll with adjustable sag is known from U.S. Pat. No. 4,213,232 and its equivalent Federal Republic of Germany application No. 28 26 316. Such rolls define a press nip with a mating roll and attempt to produce a high pressing force which is as uniform as possible over the length of the press nip. For instance, when using such a roll in the press section or in the calender of a paper making machine, it is important to remove the water from the web of paper as uniformly as possible over its width and to obtain a thickness of paper web which is as uniform as possible over its width.

It may be necessary to lift the press roll, for instance, upon an interruption in its operation. One advantage of the known roll construction is that the roll shell can be lifted a few centimeters off the mating roll without it being necessary for this purpose to lift the entire press roll, including the supporting yoke. Such lifting might be done, for instance, by arranging the entire press roll on pivoted levers. Preferably, the roll supporting yoke, together with its support pedestals, remains at all times firmly attached to the foundation, machine frame, bearing housing of the mating roll, or the like. The support pedestals may also be part of the machine frame. One merely shifts the roll shell in the press plane, transverse to its longitudinal direction. The mating roll can rest in completely unmovable bearings.

The hydraulic support device in the known press roll, for countering the mating roll in the nip is developed as a number of individual piston elements, which are displaceable radially in the press plane, and are disposed in cylindrical bores in the stationary yoke. The rotating roll shell of the press roll slides over the outer end surfaces of these non-rotating piston elements. When the direction of the force of the piston elements is from the bottom to the top, that is the piston elements are below the top of the roll shell, the press nip can be opened simply by reducing the hydraulic pressure on the roll shell lifting piston elements, so that the roll shell moves away from the mating roll under its own weight.

In U.S. Pat. No. 4,213,232, the placement of the piston elements is reversed. Therefore, the press nip is opened by lifting off the roll shell in opposition to the force of gravity. For this purpose, a hydraulic lift device is provided at both ends of the roll. It is in the form of an auxiliary piston which is arranged for radial displacement in the yoke. When that piston is acted on by pressure, it lifts the guide part on which the roll shell is mounted.

One disadvantage of this construction is that the pistons of the hydraulic support device which transmit the supporting forces from the yoke to the roll shell are arranged exclusively within the axial length of the press zone. Therefore, the so called pressing force profile, that is, the distribution of the pressing force over the length of the press zone, can be influenced only within very narrow limits, namely in the manner that the different pistons of the hydraulic supporting device are acted on by different pressures, a technique known from other publications.

In U.S. Pat. No. 4,414,890, which is equivalent to European Pat. No. 0043119, particularly FIG. 2, a different construction is described. There the roll shell is supported at each end by means of a self aligning bearing on the support pedestal of the yoke. The axial centers of the roll shell bearing and of the bearing of the mating roll lie at least approximately in the same transverse plane. In other words, the distance between the bearings of the roll shell is approximately equal to the distance between the bearings of the mating roll. That patent teaches that this bearing arrangement is important for producing a precisely uniform pressing force profile over the length of the press zone. In particular, a w-profile, which is undesirable in the art, is avoided. Furthermore, in FIG. 2 of U.S. Pat. No. 4,414,890, supplementary hydraulic support pistons are provided between the end of the press zone and the roll shell bearing. These apply additional forces to the ends of the roll shell either in the direction toward the mating roll or in the opposite direction. In this way, one can produce different pressing force profiles. But this construction also does not always afford the possibility of applying a sufficiently high additional force to the ends of the roll shell, among other reasons, because the ends of the roll shell slide over the additional support pistons.

This construction also has the disadvantage that the roll shell is no longer displaceable relative to the yoke along the press plane, that is, toward and away from the mating roll. Therefore, if it is desired to open the press nip, the entire press roll must be lifted off the mating roll by means of pivoted levers or linear guide elements, for instance, in accordance with German Pat. application P 36 10 107.9(see U.S. Pat. No. 4,796,452). Of course, the mating roll could just as well be lifted off the press roll. Pivoted lever arrangements have the disadvantage that they take up a large space and tend to vibrate. The proposed construction with linear guide elements avoids these disadvantages, but there is the unfavorable factor that the yoke must also still be displaced together with the roll shell, as previously.

SUMMARY OF THE INVENTION

The object of the present invention is to create a press roll with adjustable sag, which satisfies the following requirements:

1. As in the known press roll described at the start, it should to displace essentially only the press roll shell and not the roll supporting yoke in order to open the press nip.

2. In case different pressing forces are to be applied, the pressing force profile, measured along the length of the press nip, should be capable of being varied as desired by the application of additional forces in order to adapt to the contour of the mating roll.

In a first manner of achieving this object, a force producer, which may comprise several individual elements, is provided at each axial end of the roll. The force producer can exert a bending force on the end of the roll shell or on an extension of, e.g. a journal extending from the end of, the roll shell. The force producer acts via a displaceable guide part, which, differing from U.S. Pat. No. 4,213,232, is developed as a housing for the roll shell bearing. Therefore, the roll shell bearing extends between the roll shell, and particularly a journal toward the end of the roll shell, and the bearing housing. The bearing housing is supported on a pedestal and is movable by the force producer.

The force producer should be arranged radially outside the roll shell at the axial location of the bearing, and the force producer extends normal to the axis of the respective bearing. At this axial and radial place, the force producer can be dimensioned relatively large, for instance, as a cylinder piston unit with relatively large piston diameter. As compared with the hydraulic lift device of U.S. Pat. No. 4,213,232, which serves only for lifting off of the roll shell, forces which are several times greater can be produced with the force producer of the invention. Also compared with FIG. 2 of U.S. Pat. No. 4,414,890, the bending force can assume considerably higher values, on the one hand, because, as already mentioned, more room is available outside the roll shell and, on the other hand, because the bending force can be transmitted to the roll shell by means of the roll shell bearing which is developed as a self aligning bearing, instead of by means of the slide surface of a piston.

Preferably, a double acting force producer is provided. It can act either in the direction toward the mating roll or in the opposite direction. In one case, the lateral edges of the web of paper can be pressed more strongly than the central region of the web. In the other case, the edges of the paper web are pressed less strongly than the central region of the web. However, this feature is not an absolute necessity. One can also proceed in another manner. The roll shell of the press roll of the roll shell of the mating roll can be given a negative curvature. In this way, a higher pressing at the edges of the web of paper is already obtained with a bending force of zero. It is now sufficient for the force producer to be active only in the opposite direction, since, with average bending force, it can counteract the higher pressure on the edges of the paper web or by a further increase of the bending force, it can bring about a reduction of the pressure on the edges of the paper web.

An alternative has as its main concept arranging the bending force exerted by a force producer, or by several force producers, on the end of the roll shell, at a substantially greater distance than previously from the axial end of the length of the press zone, i.e., from the edge zone of the web of paper to be pressed. In this way, the height of the bending moment exerted on the roll shell is primarily increased by lengthening the "lever arm". A further increase in the bending moment is again possible because the bending force can be transferred to a roll shell via the roll shell bearing, developed as a self aligning bearing, and can thus be made greater.

In the second just mentioned solution, it is not necessary to arrange the force producer radially outside the roll shell. Instead, it can also be arranged radially within the roll shell. Frequently, measures from the two above described different solutions may be combined. In other words, the force producer is arranged radially outside the roll shell, so as to dimension it as large as possible and, at the same time, in order to lengthen the lever arm, it is placed at the greatest possible distance from the end of the press zone length.

In all the variants of the invention described, it may be advantageous for the distance apart of the bearings on the roll shell and of the mating roll to be approximately the same. Equality is not necessary. It is sufficient for the distance between the bearings of the roll shell to be 0.9 to 1.05 times the distance between the bearings of the mating roll. In this way, the w-shaped pressing force profile can be avoided, as described above.

If necessary, an additional function can be imparted to the force producer. Similar to U.S. Pat. No. 4,213,232, the force producer can lift the roll shell from the mating roll to open the press nip. The position of the yoke again remains unchanged in this case.

With this embodiment of the roll, in order to optimally counteract vibrations, which are still possible, vibration dampers may be provided in the hydraulic force producers and in the hydraulic support device. Furthermore, supporting pistons, which act in the direction opposite that of the operation of the hydraulic support device, may also be provided with vibration dampers.

Other objects and features of the present invention will become apparent from the following description of the preferred embodiments of the invention considered in conjunction with the accompanying drawings.

DESCRIPTION OF THE PREFERRED EMBODIMENTS

Figures 1, 2:
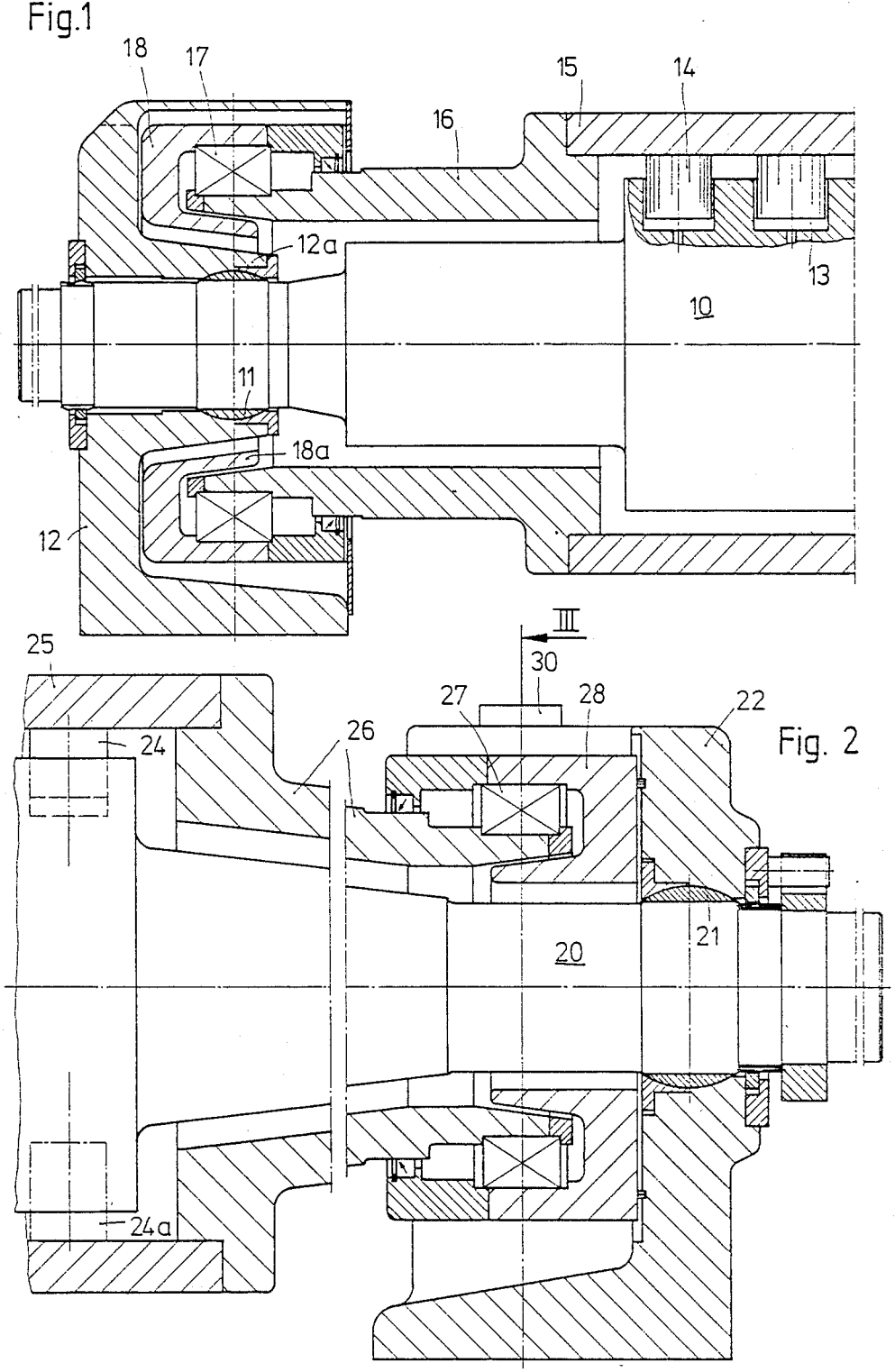
FIG. 1 is a partial longitudinal section through a first embodiment of a press roll according to the invention.
FIG. 2 is a partial longitudinal section through a second embodiment, which differs from that of FIG. 1.

The first embodiment of the press roll is shown in FIG. 1. It includes stationary yoke or beam 10, which rests via a spherical bushing 11 in a stationary supporting pedestal 12. In known manner, the yoke 10 has a number of parallel, coplanar cylindrical bores 13, disposed in the press plane with a nip of mating roll (not shown in FIG. 1, but like that in FIG. 4). In each bore 13, there is a piston 14 that can slide therein in the radial direction. These pistons together carry the interior of a rotatable roll shell 15 on their radially outer, here their top, end surfaces.

Figure 4:
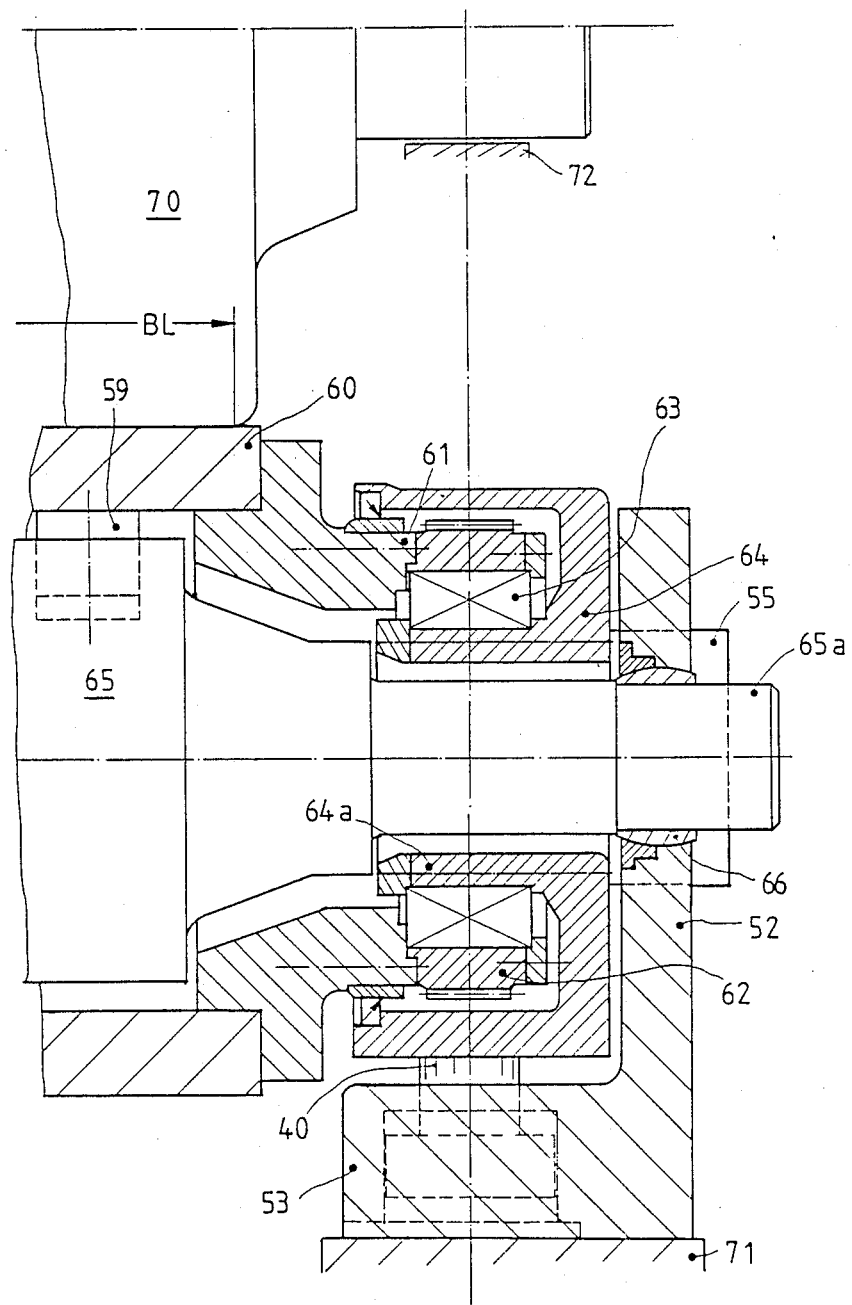
FIG. 4 is a partial longitudinal section through a third embodiment, with a drive device for the press roll shell.

The roll shell is provided on each of its opposite ends with a journal 16 as an axial extension. Only one end is visible. The journal is of smaller diameter than the roll shell, especially where it supports the respective bearing 17. At the axially outer end of the journal, there is a roll shell bearing 17 which is developed as a self aligning bearing and is arranged in a bearing housing 18. As shown in FIG. 4, the axial center of the bearing 17 lies approximately in the center of the bearing of the mating roll, which roll has been omitted in FIG. 1. Therefore, the distance between the roll shell bearings and the distance between the mating roll bearings are approximately equal.

In FIG. 1, the axial center of the spherical bearing bushing 11 is also located in the axially central transverse plane of the roll shell bearing 17. For this purpose, the supporting pedestal 12 has a tubular collar piece 12a, which extends axially in the direction toward the roll shell. The bearing housing 18 also has a tubular collar piece 18a, which cooperates with the piece 12a. Between these two collar pieces, there is ample radial space so that the bearing housing 18, together with the roll shell 15, 16, can be shifted in a radial direction relative to the yoke 10.

One advantage of the structural form shown in FIG. 1 is that the axial length of the yoke 10, measured between the spherical bushings 11, is relatively small. Within the limits of a permissible sag, the diameter of the yoke can be also kept relatively small. For this, however, a relatively large diameter of roll shell bearing 17 must be tolerated.

The embodiment shown in FIG. 2 is different. The support pedestal 22 does not have a collar piece which extends toward the roll shell. Thus, the spherical bearing bushing 21 is arranged axially outside the bearing housing 28. This has the advantage that the diameter of the bearing housing 28 and of the roll shell bearing 27 is less than is possible in FIG. 1. In this way, the bearing housing 28 and the support pedestal 22 extend a shorter distance in the direction toward the mating roll. Thus, there is less danger than with the embodiments of FIG. 1 that these structural parts of the press roll will interfere with removal and installation of the mating roll. Yoke 20, pistons 24, roll shell 25 and journal 26 are developed similarly to the corresponding parts in FIG. 1. The pistons 24 act in the direction toward the mating roll. If necessary, pistons 24a which act in the opposite direction can additionally be provided.

Figure 3:
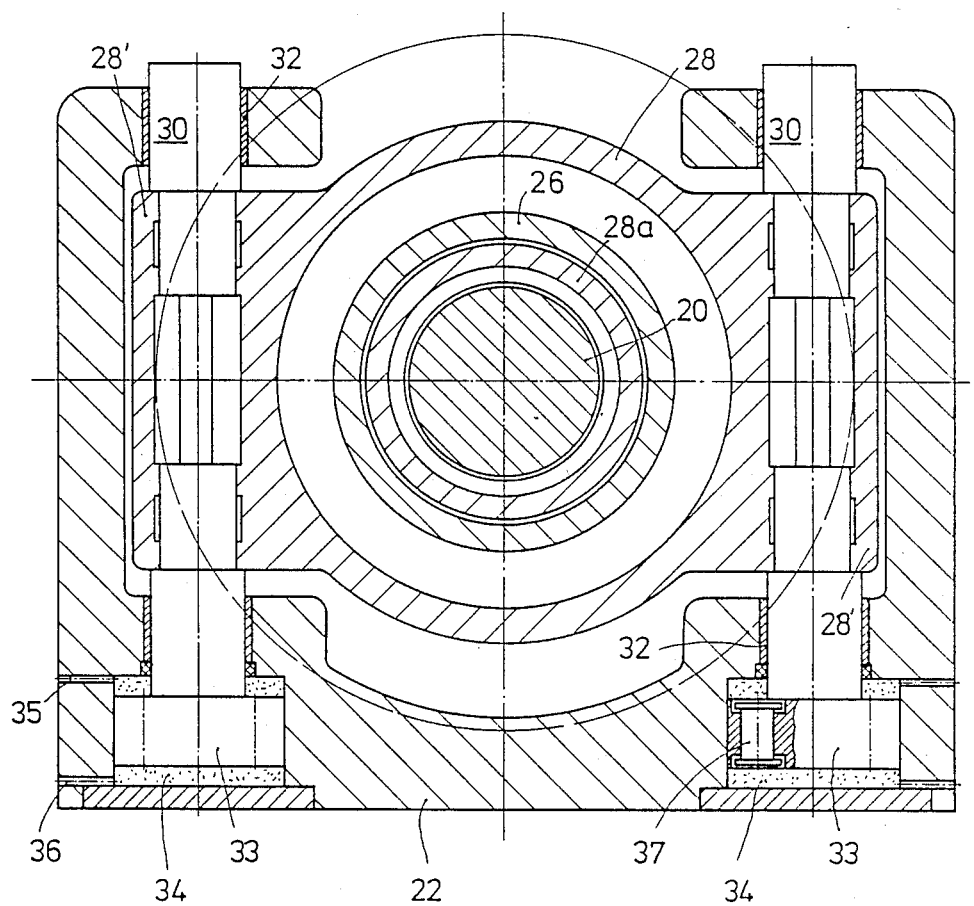
FIG. 3 is a cross-section along the line III of FIG. 2.

FIG. 3 shows two hydraulic force producers for the press roll according to FIG. 2. Force producers for the press roll according to FIG. 1 could also be developed in similar manner. The bearing housing 28 in FIG. 3 has support beads or flanges 28' along and projecting from its two sides.

In each bead 28', a guide rod 30 is inserted. The rods 30 extend into corresponding guide holes which are provided in the support pedestal 22. Those holes are lined with slide bushings 32. Each guide rod 30 at the same time serves as a piston rod for a respective hydraulic piston 33, which piston is acted upon on both of the top and bottom sides of the piston for moving it up or down. A respective cylindrical space 34 with connecting lines 35, 36 for a pressure liquid, is provided in the support pedestal for each piston 33. If deemed necessary, the pistons 33 can be provided with means 37 for damping vibrations. In FIGS. 2 and 3, two guide rods 30 are provided. Each lies in the axial central transverse plane of the bearing 27. Alternatively, four guide rods, two on each side, could also be used, arranged in the corners of a rectangle, as seen from above. As seen in the cross-section of FIG. 3, the sizes and the spacing of the guide rods could thereby be reduced. The force producer described above is at the axial location of the bearing and extends generally normal to the axis of the bearing.

In FIGS. 1 and 2, the bearing 17, 27 for the roll shell 15, 25 rests, on the one hand, on the outside of the journal 16, 26 and, on the other hand, on the inside of the bearing housing 18, 28. The bearing housing 18, 28 through flanges or beads like 28' and through rods 30, etc., are shiftably supported on the pedestal 12, 22.

A different embodiment is shown in FIG. 4. In that case, the roll shell 60 has a journal 61. An outer gear rim 62 is screwed onto the outer end of that journal. The roll shell bearing 63, corresponding to bearings 17, 27, is now also arranged on the outer end of the journal 61. But, the bearing 63 is within the outer gear rim 62 and thus inside the roll shell journal, rather than outside of it as in FIGS. 1 and 2. Via the antifriction bearing 63, the rotatable roll shell 60 rests on a displaceable bearing housing 64 which corresponds to housing 28. The housing 64 has a tubular collar piece 64a which extends into the inside of the outer gear rim 62, so that the self aligning bearing 63 rests on the outside of the collar piece 64a.

A stationary yoke 65 extends through the tubular roll shell 60. The yoke rests by means of a pin 65a formed at its end and a spherical bushing 66 around the pin 65a within a support pedestal 52 which is rigidly fastened to a frame 71. For transmitting pressing force from the yoke 65 to the roll shell 60, a number of support pistons 59 are again provided in the yoke. Only one of them is shown in FIG. 4. A mating roll 70 is schematically indicated. It has a bearing 72, with an axial center which lies in the same transverse plane as the axial center of the bearing 63. The length of the press zone is marked BL.

The bearing housing 64 at the same time forms the housing for a gear transmission which drives the roll shell 60 to rotate. As can be noted from FIG. 5, a drive pinion 67, which drivingly engages with the outer gear rim 62, is mounted in a lateral extension 68 of the gear housing 64. The drive pin 69 of the pinion 67 can be connected to a motor, in known manner, by a universal shaft which takes the displaceability of the gear housing 64 into account, and over other drive parts, not shown. Otherwise, the gearing can be developed in accordance with U.S. Pat. No. 4,676,117, equivalent to Federal Republic of Germany Pat. No. 33 30 204.

Figure 5:
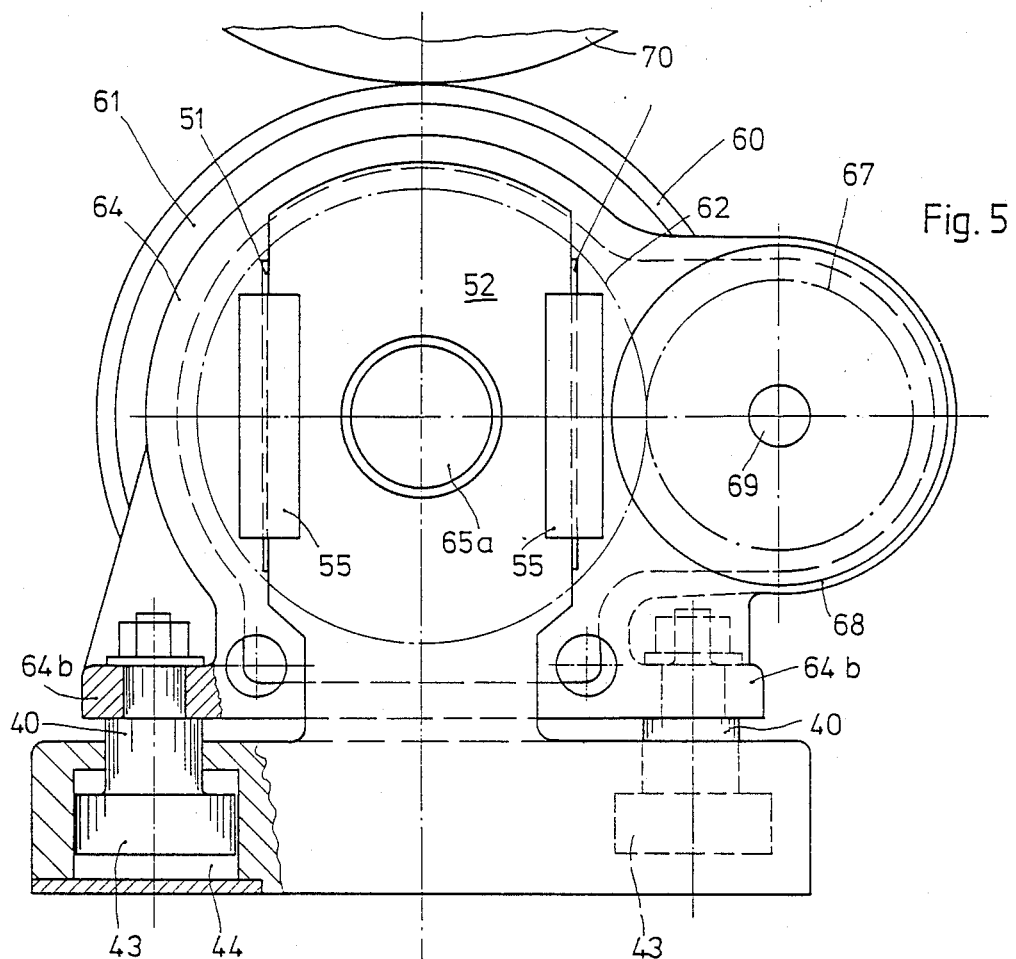
FIG. 5 is a side view of the embodiment of FIG. 4.
Figure 6:
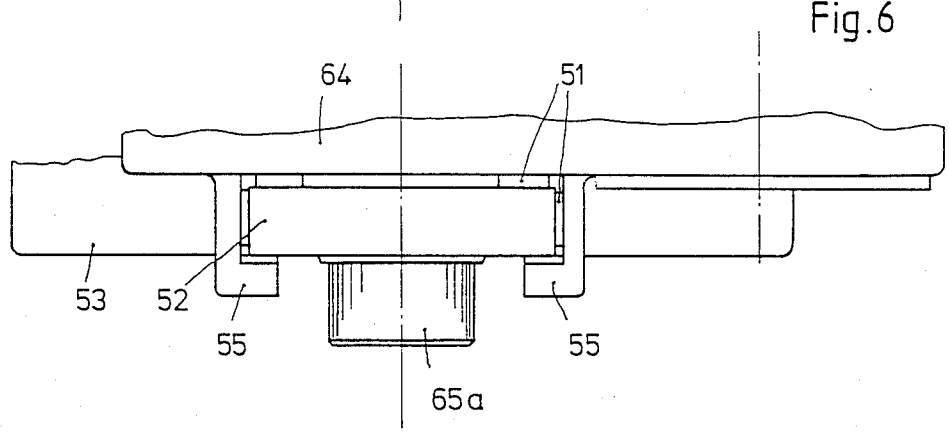
FIG. 6 is a partial view from above of the embodiment of FIG. 4.

The embodiment shown in FIGS. 4 to 6 differs from the earlier described embodiments in that the linear or radial guidance for the bearing housing 64 is arranged separately from the hydraulic force producer. Linear guide elements comprise guide claws 55 on the gear housing 64. The claws extend around the support pedestal 52 and have guide ledges 51 on both sides (FIG. 6). In the baseplate 53 of the support pedestal 52, preferably in the axially central plane of the roll shell bearing 63, there are two cylindrical bores 44. Each bore contains a lift piston 43 which can be acted on on both sides to be moved up and down. The piston rod 40 of each piston 43 is bolted to a base flange 64b of the gearing housing 64.

The linear guide elements 55 shown in FIGS. 4 to 6, and as seen in the side view of FIG. 5, have the advantage that they do not extend beyond the space which is determined by the outside diameter of the roll shell 64. It would also be conceivable to form lateral guide surfaces on the pin 65a of the yoke, in accordance with the example of FIG. 2 of U.S. Pat. No. 4,213,232, and to provide guide surfaces adapted thereto on the inside of the collar piece 64a of the gear housing 64. The linear guide elements 55 arranged on the outside of the support pedestal have the advantages, however, that they can be arranged at a greater distance from each other and can be made of greater length. This increases the reliability of the guidance function, without the danger of canting.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A press roll with adjustable sag comprising:

a yoke for extending the length of the press roll and for defining a support;

a respective support pedestal at each end of the press roll and means at each end of the yoke for resting on the pedestal for supporting the yoke there;

a hollow roll shell disposed around the yoke and rotatable around and with respect to the yoke, the roll shell having an exterior for forming a nip with a mating roll extending parallel to the roll shell, and the press roll having a press plane which is the plane joining the axis of the press roll and the axis of a mating roll;

a respective self-aligning bearing disposed at each end of the roll shell for supporting the end of the roll shell for rotation;

a guide part for the end of the roll shell on which each roll shell bearing is supportable;

means inside the roll shell and extending between the roll shell and the yoke for supporting the roll shell on the yoke, and the roll shell being rotatable past the supporting means at the yoke;

a respective force producer at each end of the press roll, located radially outside of the roll shell and at axial locations along the roll shell coinciding with axial locations of the roll shell bearings, and the force producer being disposed between the guide part for the bearing, on the one hand, and the support pedestal, on the other hand; the force producer being connected with the guide part for displacing the guide part and the roll shell supported thereby generally along the press plane and relative to the yoke;

the guide part for the roll shell bearing comprising a bearing housing for the roll shell bearing and further comprises guide elements connected with the guide part for guiding the guide part to move under the influence of the force producer; and the guide elements comprising linear guide elements for guiding the guide part to move linearly at least approximately in the press plane; the linear guide elements being arranged outside the roll shell.

2. The press roll of claim 1, wherein the supporting means comprises a hydraulic supporting device disposed in the yoke for transmitting supporting forces, in the press plane, from the yoke to the inside of the roll shell for displacing the roll shell with respect to the yoke for adjusting roll shell sag.

3. The press roll of claim 2, further comprising vibration dampers provided in the hydraulic supporting device.

4. The press roll of claim 1, wherein the roll shell exterior is shaped for cooperating with the mating roll for defining a press nip, and the roll shell bearings being supported to the roll shell and being spaced axially at a relatively great distance from the axial ends of the press nip for defining a lever arm between the roll shell bearing and the respective axial end of the press nip.

5. The press roll of claim 4, wherein the roll shell includes a respective journal defined thereon at each end axially beyond the respective ends of the press nip; the support bearing at each end of the press roll being supported on the respective journal there.

6. The press roll of claim 5, wherein the journal of the roll shell is of smaller diameter than the roll shell at the press nip, and the bearing has the correspondingly smaller diameter resulting from its engagement with the smaller diameter journal of the roll shell.

7. The press roll of claim 5, wherein the journal hollow and the bearing is disposed at the inside of the hollow of the journal.

8. The press roll of claim 5, wherein the bearing is disposed around the outside of the journal.

9. In combination, the press roll of claim 1, and a mating roll, the mating roll including ends and support bearings at the ends of the mating roll for supporting the mating roll for rotating; the mating roll and its bearings being shaped and positioned that the mating roll contacts the roll shell for defining the nip therebetween.

10. The press roll of claim 9, wherein the distance between the roll shell bearings at the ends of the press roll is approximately equal to the distance between the mating roll bearings.

11. The press roll of claim 1, wherein the roll shell has a portion shaped for cooperating with the mating roll for defining a press nip, and the roll shell bearings being supported to the roll shell and being spaced axially at a relatively great distance from the axial ends of the press nip for defining a lever arm between the roll shell bearing and the respective axial end of the press nip;

the guide elements being disposed in the region of the axial central plane and extending normal to the axis of the bearings of the roll shell.

12. The press roll of claim 11, further comprising vibration dampers provided in the force producer.

13. The press roll of claim 1, wherein the roll shell includes a respective journal defined thereon at each end axially beyond the ends of the press nip; the support bearing at each end of the press roll being supported on the respective journal there;

the journal of the roll shell is of smaller diameter than the roll shell at the press nip, and the bearing has the correspondingly smaller diameter resulting from its engagement with the smaller diameter journal of the roll shell.

14. The press roll of claim 1, wherein the linear guide elements are supported on the pedestal.

15. The press roll of claim 14, wherein the force producer for moving the guide par in the press plane is physically separated from the linear guide elements for guiding the motion of the guide part under the force exerted by the force producer.

16. The press roll of claim 1, further comprising at one end of the roll shell, an outer gear rim supported on the roll shell;

a drive pinion shaped and oriented for meshing with the outer gear rim, such that drive of the drive pinion rotates the outer gear rim which in turn rotates the roll shell; the drive pinion being supported on the displacable guide part;

the displaceable guide part further comprising a gear housing for the outer gear rim and for the driver pinion.

17. A press roll with adjustable sag comprising:

a yoke for extending the length of the press roll and for defining a support;

a respective support pedestal at each end of the press roll and means at each en d of the yoke for resting on the pedestal for supporting the yoke there;

a hollow roll shell disposed around the yoke and rotatable around and with respect to the yoke;

a mating roll extending parallel to the roll shell, forming a press nip with such shell, and being supported at axial ends by respective mating roll bearings;

a press plane being defined as the plane joining the axis of the press roll and the axis of a mating roll;

a respective self-aligning bearing disposed at each end of the roll for supporting the end of the roll shell for rotation, each roll shell bearing being supported to the roll shell;

a guide part for the end of the roll shell on which each roll shell bearing is supportable;

means inside the roll shell and extending between the roll shell and the yoke for supporting the roll shell on the yoke, and the roll shell being rotatable past the supporting means at the yoke;

a respective force producer at each end of the press roll, located at axial locations along the roll shell coinciding with axial locations of the roll shell bearings, and the force producer being disposed between the guide part for the bearing, on the one hand, and the support pedestal, on the other hand; the force producer being connected with the guide part for displacing the guide part and the roll shell supported thereby generally along the press plane and relative to the yoke; and the distance between the roll shell bearings being approximately equal to the distance between the mating roll bearings, thereby to create a desirably-long lever arm between each roll bearing and an adjacent axial end of the press nip.

18. The press roll of claim 17, wherein the supporting means comprises a hydraulic supporting device disposed in the yoke for transmitting supporting forces, in the press plane, from the yoke to the inside of the roll shell for displacing the roll shell with respect to the yoke for adjusting the roll shell sag.

19. The press roll of claim 18, further comprising vibration dampers provided in the hydraulic supporting device.

20. The press roll of claim 17, wherein the roll shell includes a respective journal defined thereon at each end axially beyond the respective ends of the press nip; the support bearing at each end of the press roll being supported on the respective journal there.

21. The press roll of claim 20, wherein the journal of the roll shell is of smaller diameter than the roll shell at the press nip, and the bearing has the correspondingly smaller diameter resulting from its engagement with the small diameter journal of the roll shell.

22. The press roll of claim 20, wherein the journal is hollow and the bearing is disposed at the inside of the hollow of the journal.

23. The press roll of claim 20, wherein the bearing is disposed around the outside of the journal.

24. The press roll of claim 17, wherein the force producer includes means for applying force to the guide part for moving it in one direction for moving the press roll away from a mating roll along the press plane and in the other direction for moving the press roll toward the mating roll along the press plane.

25. The press roll of claim 24, wherein the guide part for the roll shell bearing comprises a bearing housing for the roll shell bearing and further comprises guide elements connected with the guide part for guiding the guide part to move under the influence of the force producer.

26. The press roll of claim 25, wherein the guide elements are disposed in the region of the axial central plane and extend normal to the axis of the bearings of the roll shell.

27. The press roll of claim 26, further comprising vibration dampers provided in the force producer.

28. The press roll of claim 25, wherein the guide elements comprise linear guide elements for guiding the guide part to move linearly at least approximately in the press plane; the linear guide elements being arranged outside the roll shell in the axial region of the support bearings of the roll shell.

29. The press roll of claim 28, wherein the roll shell includes a respective journal defined thereon at each end axially beyond the ends of the press nip; the support bearing at each end of the press roll being supported on the respective journal there;

the journal of the roll shell is of smaller diameter than the roll shell at the press nip, and the bearing has the correspondingly smaller diameter resulting from its engagement with the smaller diameter journal of the roll shell.

30. The press roll of claim 28, wherein the linear guide elements are supported on the pedestal.

31. The press roll of claim 30, wherein the force producer for moving the guide part in the press plane is physically separated from the linear guide elements for guiding the motion of the guide part under the force exerted by the force producer.

32. The press roll of claim 17, further comprising at one end of the roll shell, and outer gear rim supported on the roll shell;

a drive pinion shaped and oriented for meshing with the outer gear rim, such that drive of the drive pinion rotates the outer gear rim which in turn rotates the roll shell; the drive pinion being supported on the displaceable guide part; the displaceable guide part further comprising a gear housing for the outer gear rim and for the drive pinion.

* * * * *